United States Patent
Nydahl (10) Patent No.: US 11,414,168 B2
(45) Date of Patent: Aug. 16, 2022

(54) METHOD FOR DETERMINING A SPEED PROFILE FOR A MARINE VESSEL

(71) Applicant: CPAC SYSTEMS AB, Gothenburg (SE)

(72) Inventor: David Nydahl, Partille (SE)

(73) Assignee: CPAC SYSTEMS AB, Gothenburg (SE)

(*) Notice: Subject to any disclaimer, the term of this patent is extended or adjusted under 35 U.S.C. 154(b) by 335 days.

(21) Appl. No.: 16/617,754

(22) PCT Filed: Jun. 13, 2017

(86) PCT No.: PCT/EP2017/064386
§ 371 (c)(1),
(2) Date: Nov. 27, 2019

(87) PCT Pub. No.: WO2018/228670
PCT Pub. Date: Dec. 20, 2018

(65) Prior Publication Data
US 2020/0110412 A1 Apr. 9, 2020

(51) Int. Cl.
*B63H 21/21* (2006.01)
*B63H 25/04* (2006.01)
*G05D 1/02* (2020.01)
*B63B 79/40* (2020.01)

(52) U.S. Cl.
CPC .............. *B63H 25/04* (2013.01); *B63B 79/40* (2020.01); *B63H 21/21* (2013.01); *G05D 1/0206* (2013.01); *B63H 2021/216* (2013.01)

(58) Field of Classification Search
CPC .. B63H 25/04; B63H 21/21; B63H 2021/216; B63H 25/42; B63H 2025/045; B63B 79/40; B63B 49/00; G05D 1/0206
See application file for complete search history.

(56) References Cited

U.S. PATENT DOCUMENTS

| 8,924,054 B1* | 12/2014 | Arbuckle | B63H 25/42 |
| | | | 701/21 |
| 9,377,780 B1* | 6/2016 | Arbuckle | G05D 1/00 |
| 9,896,174 B1* | 2/2018 | Anschuetz | G05D 3/00 |

(Continued)

FOREIGN PATENT DOCUMENTS

| DE | 10141805 A1 | 5/2002 |
| FR | 2737026 A1 | 1/1997 |
| WO | 2015072895 A1 | 5/2015 |

OTHER PUBLICATIONS

Hasssan et al., A two-fold strategy for designing minimal fuel consumption, superior seakeeping highly maneuverable marine vessels based on ASAP hull technology and Sontag non-linear feedback stabilization, 2009, IEEE, p. 1-8 (Year: 2009).*

(Continued)

*Primary Examiner* — McDieunel Marc
(74) *Attorney, Agent, or Firm* — Venable LLP; Jeffri A Kaminski (57) ABSTRACT

A method for determining a speed profile for a marine vessel. The method includes determining a travel segment along which the marine vessel is expected to travel; determining a curvature value indicative of a curvature of the travel segment; on the basis of at least the curvature value, determining a speed profile for the marine vessel along the travel segment.

14 Claims, 4 Drawing Sheets

(56) References Cited

U.S. PATENT DOCUMENTS

| | | | | |
|---|---|---|---|---|
| 10,054,956 | B1* | 8/2018 | Anschuetz | B63H 25/02 |
| 10,112,692 | B1* | 10/2018 | Anschuetz | G05D 3/00 |
| 2007/0178779 | A1 | 8/2007 | Takada et al. | |
| 2010/0168942 | A1 | 7/2010 | Noffsinger et al. | |
| 2018/0050779 | A1* | 2/2018 | Anschuetz | B63H 20/10 |
| 2018/0057133 | A1* | 3/2018 | Andrasko | B63B 79/20 |
| 2019/0023368 | A1* | 1/2019 | Andrasko | G05D 1/0875 |

OTHER PUBLICATIONS

Fossen et al., Kalman filtering for positioning and heading control of ships and offshore rigs, 2009, IEEE, p. 32-46 (Year: 2009).*
Khaled et al., Guidance and control scheme for under-actuated marine surface vessels, 2010, IEEE, p. 5230-5235 (Year: 2010).*
Rossby et al., Free falling Probe Current and Temperature Measurement System, 2008, IEEE, p. 56-60 (Year: 2008).*
International Search Report and Written Opinion in corresponding International Application No. PCT/EP2017/064386 dated Mar. 16, 2018 (8 pages).
International Preliminary Report on Patentability in corresponding International Application No. PCT/EP2017/064386 dated Sep. 13, 2019 (6 pages).

\* cited by examiner

METHOD FOR DETERMINING A SPEED PROFILE FOR A MARINE VESSEL

CROSS-REFERENCE TO RELATED APPLICATIONS

This application is a U.S. National Stage application of PCT/EP2017/064386, filed Jun. 13, 2017 and published on Dec. 20, 2018 as WO/2018/228670, all of which is hereby incorporated by reference in its entirety.

TECHNICAL FIELD

The present invention relates to a method for determining a speed profile for a marine vessel. Moreover, the present invention relates to a method for determining a travel path time along a travel path for a marine vessel as well as a method for determining a target travel path from a start position to an end position for a marine vessel. Furthermore, the present invention relates to each one of: a control unit for a marine vessel, a control assembly for a marine vessel, a propulsion assembly for a marine vessel and a marine vessel.

BACKGROUND OF THE INVENTION

Marine vessels, in particular leisure boats, may be equipped with an autopilot for controlling the performance of the marine vessel. An example of such an autopilot is presented in US 2007/0178779 A1.

By virtue of the autopilot, the marine vessel may be controlled so as to follow a predetermined route, e.g. by following a set of waypoints entered by a user, at a certain speed. However, for e.g. leisure boats, in addition to the requisite of arriving at a certain location, following a certain route, it is generally of relevance that the voyage as such is pleasant. Although the US 2007/0178779 A1 autopilot may be able to carry out the task of following a certain route at a certain speed, it is not certain that the voyage will be perceived as pleasant by passengers of the marine vessel. Moreover, it is not certain that a boat may be able to follow the predetermined route at the selected speed.

SUMMARY OF THE INVENTION

In view of the above, an object of a first aspect of the present invention is to obtain a method for controlling a marine vessel wherein the marine vessel is controlled such that appropriate travelling conditions are ensured during a voyage.

The above object is obtained by a method according to claim 1.

As such, the first aspect of the present invention relates to a method for determining a speed profile for a marine vessel. The method comprises:
  determining a travel segment along which the marine vessel is expected to travel;
  determining a curvature value indicative of a curvature of the travel segment;
  on the basis of at least the curvature value, determining a speed profile for the marine vessel along the travel segment.

The above method implies that the speed of a marine vessel may be controlled, e.g. automatically controlled, during a travel segment taking the curvature of the travel segment into account. This implies comfortable travel conditions since e.g. sharp turns at high speeds may be avoided. Moreover, the above method implies less dynamic loads imparted on the marine vessel which in turn may improve e.g. the fatigue life of the marine vessel. Further, by virtue of the above method, it may be possible to determine a speed profile that is suitable from a path following point of view.

Optionally, the method further comprises determining a desired lateral acceleration of the marine vessel along the travel segment and
  on the basis of at least the curvature value and the desired lateral acceleration, determining the speed profile for the marine vessel along the travel segment.

Lateral accelerations are generally perceived as unpleasant by passengers of a marine vessel. Moreover, excessive lateral accelerations may cause damage to components of the marine vessel. Furthermore, large lateral accelerations may render it difficult for the marine vessel to follow the travel segment. As such, controlling the speed of the marine vessel, taking a desired lateral acceleration into account, may be beneficial.

Optionally, the desired lateral acceleration is a predetermined lateral acceleration. Purely by way of example, the desired lateral acceleration may be determined on the basis of at least one of the following concerns: comfort, loads and path following.

Optionally, the method further comprises determining an expected roll angle of the marine vessel along the travel segment and determining the desired lateral acceleration on the basis of at least the expected roll angle.

Optionally, the desired lateral acceleration is determined such that an absolute value of the difference between the desired lateral acceleration and the gravitational acceleration multiplied by the tangent of the expected roll angle is below a threshold value.

Optionally, the speed profile is determined as a speed profile that the marine vessel can assume whilst being able to follow the travel segment.

Optionally, the method further comprises determining a lateral thrust produced by a propulsion assembly of the marine vessel and on the basis of at least the curvature value and the lateral thrust and determining the speed profile for the marine vessel along the travel segment.

Optionally, the speed profile is determined using a lookup table comprising speed profiles for different curvature values.

Optionally, the curvature value is indicative of a radius of curvature of the travel segment.

Optionally, the radius of curvature is determined using the location of at least three points located on the travel segment.

Optionally, the method further comprises setting a maximum allowable speed for the marine vessel.

Optionally, the speed profile is a constant speed along the travel segment.

A second aspect of the present invention relates to a method for determining a travel path time along a travel path for a marine vessel, the method comprising:
  determining a travel segment set for the travel path, the travel segment set comprising at least one travel segment;
  for each travel segment in the travel segment set, determining a speed profile according to any one of the preceding claims and, using at least the speed profile, determining a segment travel time along the segment,
  summarizing the segment travel time for each travel segment in the travel segment set to thereby obtain the travel path time.

A third aspect of the present invention relates to a method for determining a target travel path from a start position to an end position for a marine vessel, the method comprising:

determining a travel path set comprising a plurality of travel paths, each travel path following an individual path from the start position to the end position;

for each travel path in the travel path set, determining a travel path time in accordance with the method of claim 10, and setting the target travel path as the travel path having the shortest travel path time.

A fourth aspect of the present invention relates to a control unit for a marine vessel, the control unit is adapted to perform all the method steps according to any one of the preceding claims.

Optionally, the control unit is adapted to issue speed control information, indicative of the speed profile, to a speed controller of the marine vessel.

A fifth aspect of the present invention relates to a control assembly for a marine vessel, the control assembly comprising a control unit according to the fourth aspect of the present invention. The control assembly further comprises a speed controller adapted to communicate with the control unit.

A sixth aspect of the present invention relates to a propulsion assembly for a marine vessel, the propulsion assembly comprising at least one propulsion unit and a control assembly according to the fifth aspect of the present invention. The speed controller of the control assembly is adapted to communicate with the at least one propulsion unit.

A seventh aspect of the present invention relates to a marine vessel comprising a control unit according to the fourth aspect of the present invention and/or a control assembly according to the fifth aspect of the present invention or a propulsion assembly according to the sixth aspect of the present invention.

BRIEF DESCRIPTION OF THE DRAWINGS

With reference to the appended drawings, below follows a more detailed description of embodiments of the invention cited as examples.

In the drawings.

DETAILED DESCRIPTION OF PREFERRED EMBODIMENTS

Figure 1:
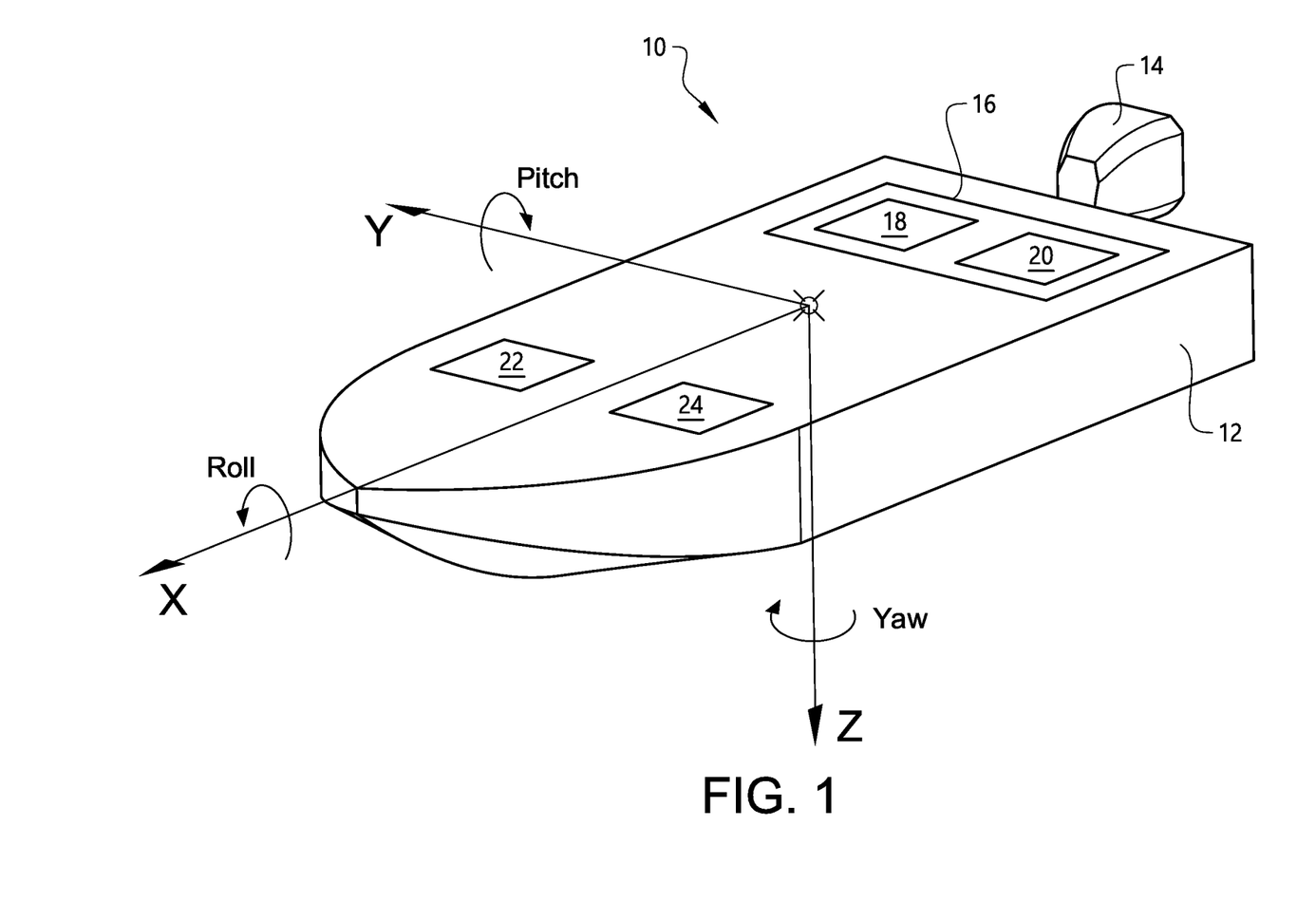
FIG. 1 illustrates an embodiment of a marine vessel.

FIG. 1 illustrates an embodiment of a marine vessel 10. The FIG. 1 marine vessel 10 is exemplified as a boat, such as a leisure boat. As a non-limiting example, embodiments of the marine vessel may have a length (length between perpendiculars) within the range of 3 to 20 meters.

As may be gleaned from FIG. 1, the embodiment of the marine vessel 10 illustrated therein comprises a propulsion assembly 12 which in turn comprises at least one propulsion unit 14 and a control assembly 16. Moreover, as indicated in the FIG. 1 embodiment, the control assembly 16 may comprise a control unit 18 and a speed controller 20. The speed controller 20 may be adapted to communicate with the control unit 18. Moreover, the speed controller 20 may be adapted to issue control signals to the at least one propulsion unit 14. Embodiments of the marine vessel 10 are also envisaged wherein the control unit 18 is adapted to issue control signals directly to the at least one propulsion unit 14.

Embodiments of the marine vessel 10 may comprise a propulsion assembly set comprising two or more propulsion units (not shown).

The control unit 18 may be adapted to receive instructions from an operator via an interface 22. Purely by way of example, the interface may comprise at least one of a lever, a knob, a button or a touch screen (not shown). Moreover, the marine vessel 10 may comprise a positioning system 24, such as a global positioning system, which may be adapted to communicate with the control unit 18.

FIG. 1 also illustrates a coordinate system for the marine vessel 10 and as well as presenting a nomenclature for rotations of the marine vessel 10. To this end, the coordinate system has a longitudinally extending X-axis, a transversally extending Y-axis and a vertically extending Z-axis. The X-, Y- and Z-axes are perpendicular to each other.

Moreover, FIG. 1 illustrates that rotation around the X-axis is referred to as roll, rotation around the Y-axis is referred to as pitch and rotation around the Z-axis is referred to as yaw.

Figure 2:
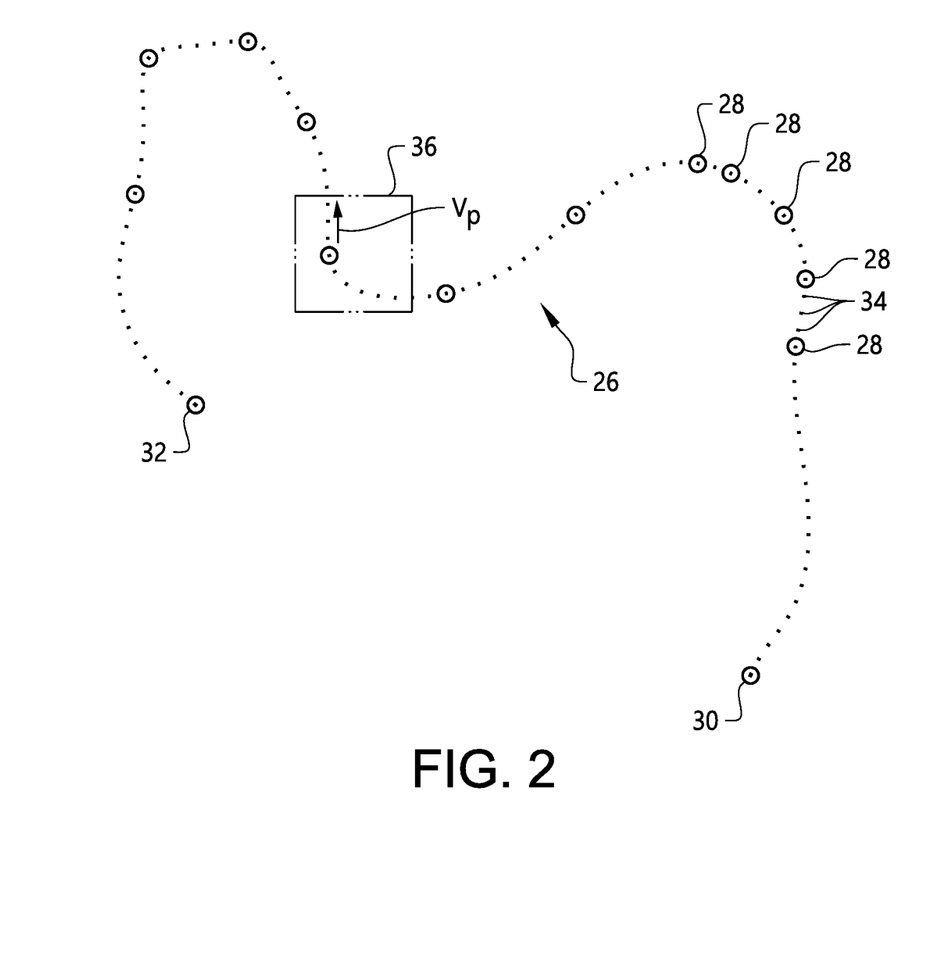
FIG. 2 illustrates an example of a marine vessel route.

FIG. 2 illustrates an example of a route 26 that a marine vessel 10 is intended to follow. Purely by way of example, the route 26 may have been set by a user, for instance by feeding a set of waypoints 28 into a control unit 18, e.g. by using the interface 22 discussed hereinabove in relation to FIG. 1. As may be gleaned from FIG. 2, the route 26 may comprise a start position 30 and an end position 32. Further, as indicated in FIG. 2, the route 26 may comprise route points 34. As a non-limiting example, the route points 34 may be determined by means of interpolation, for instance a non-linear interpolation, between the waypoints 28. As such, certain route points 34 may coincide with the waypoints 28.

As a non-limiting example, the user may also input a maximum speed for the marine vessel 10 when following the route. Based on the route 26, and possibly also the maximum speed, the control unit 18 may be adapted to issue signals to the speed controller and/or the at least one propulsion unit 14 such that the marine vessel 10 follows the route 26. As a non-limiting example, the signal may comprise information as regards a throttle position for the at least one propulsion unit 14, assuming that the propulsion unit 14 comprises an internal combustion engine, and/or the pitch of the propeller, assuming that the propulsion unit 14 comprises a variable pitch propeller (not shown).

The present invention proposes a method for determining a speed profile for a marine vessel 10. Purely by way of example, the below method, as well as embodiments of the below method, may be performed by the control unit 18.

Embodiments of the method will be presented hereinbelow.

The method comprises determining a travel segment 36 along which the marine vessel 10 is expected to travel. As a non-limiting example, the route 26 may be split up into segments of similar or dissimilar length. Alternatively, only certain portions of the route 26 may be defined as segments. Purely by way of example, portions of the route 26 having a curvature within a certain range may be identified as a segment 36 for the purpose of the inventive method.

Figure 3:
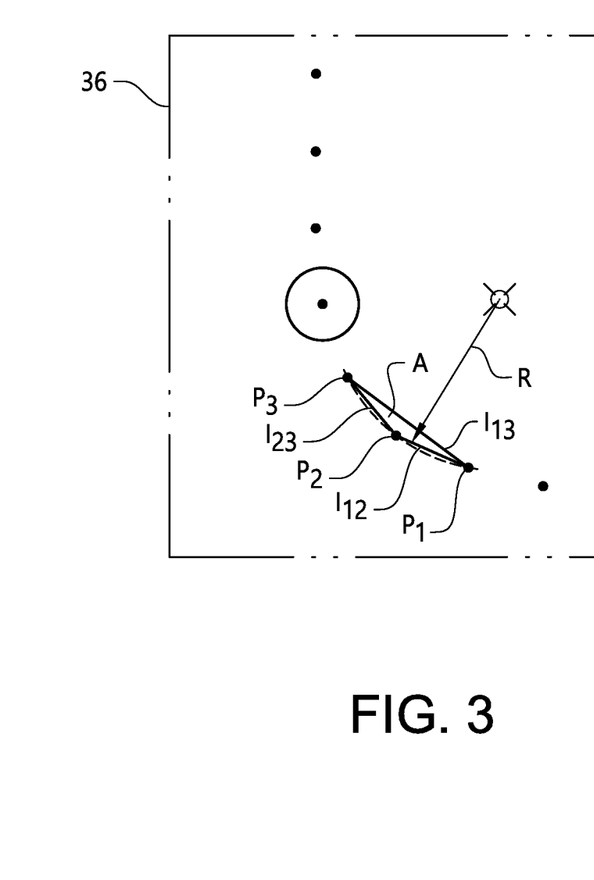
FIG. 3 is an enlargement of a portion of the FIG. 2 route.

Further, the method comprises determining a curvature value indicative of a curvature of the travel segment 36. To this end, FIG. 3 illustrates an enlargement of the FIG. 2 segment 36. Moreover, FIG. 3 illustrates that a radius of curvature R can be determined for the segment 36 and be used as the curvature value. However, it is also envisaged that other entities may be used for determining the curvature of the segment 36.

The radius of curvature R may be determined in a plurality of different ways. An example is presented hereinbelow with reference to FIG. 3. As may be gleaned from FIG. 3, the segment 36 comprises a set of route points 34. Using the position of at least three route points $P_1$, $P_2$, $P_3$, the radius of curvature R can be determined. In the FIG. 3 example, the three route points $P_1$, $P_2$, $P_3$ are adjacent but it also envisaged that non-adjacent route points may be used.

In order to estimate the radius of curvature R, the horizontal position for each one of the three route points $P_1$, $P_2$, $P_3$ is determined. The horizontal distance $l_{12}$, $l_{13}$, $l_{23}$ between pairs of the three points $P_1$, $P_2$, $P_3$ are determined, so is the area A of the triangle formed by the three points $P_1$, $P_2$, $P_3$.

The radius of curvature can thereafter be estimated using the following equation:

$$R = \frac{l_{12} l_{13} l_{23}}{4A} \qquad (Eq. 1)$$

Moreover, the method according to the present invention comprises, on the basis of at least the curvature value, determining a speed profile $v_p$ for the marine vessel 10 along the travel segment 36. A speed profile $v_p$ is indicated in FIG. 2.

The speed profile $v_p$ may for instance be constant speed along the travel segment 36. However, it is also contemplated that the speed profile $v_p$ may comprise a set of speeds wherein the speed is dependent on the position in the travel segment 36. For instance, the speed profile $v_p$ may indicate an increasing speed through a turn. As such, as a non-limiting example, the marine vessel 10 may slow down when entering a turn and thereafter increase the speed throughout the turn such that the marine vessel 10 exits the turn at a relatively high speed. However, it is also envisaged that the other speed profile types may be employed. Purely by way of example, it is contemplated that a speed profile may indicate a decreasing speed throughout a turn. As a non-limiting example, a speed profile may be determined on the basis of a single speed value, which for instance is determined in accordance with any one of the below examples, which may be used as a reference speed for the speed profile, e.g. a maximum speed for a speed profile. Purely by way of example, a predetermined speed profile may be used which may be scaled using the single speed value in order to arrive at a suitable speed profile throughout the travel segment 36.

The method may further comprise determining a desired lateral acceleration $a_{yd}$ of the marine vessel 10 along the travel segment 36 and, on the basis of at least the curvature value and the desired lateral acceleration $a_{yd}$, determining the speed profile for the marine vessel along the travel segment 36.

Generally, the lateral acceleration $a_y$ of the marine vessel 10 during a turn may be determined in accordance with the following:

$$a_y = \frac{v^2}{R} \qquad (Eq. 2)$$

wherein:
v=the speed of the marine vessel 10, and
R=the radius of curvature.

As a non-limiting example, the desired lateral acceleration $a_{yd}$ may be a predetermined lateral acceleration. For instance, the desired lateral acceleration $a_{yd}$ may be a maximum allowable lateral acceleration. As a non-limiting example, the desired lateral acceleration $a_{yd}$ may be set by an operator of the marine vessel. Purely by way of example, the predetermined lateral acceleration may within the range of 1-6 m/s$^2$.

As such, using Eq. 2 hereinabove, the speed v of the marine vessel 10 may be determined in accordance with the following:

$$v \leq \sqrt{a_{yd} R} \qquad (Eq. 3)$$

As another option, a desired lateral acceleration may be determined by determining an expected roll angle γ of the marine vessel 10 along the travel segment and determining the desired lateral acceleration $a_{yd}$ on the basis of at least the expected roll angle γ.

For instance, the desired lateral acceleration $a_{yd}$ may be determined such that the marine vessel 10 undergoes a so called "true turn" or at least a turn that is close to a "true turn". The "true turn" concept is presented in relation to FIG. 4. As may be gleaned from FIG. 4, during a turn of the marine vessel 10, two accelerations are imparted on the vessel 10: a gravitational acceleration g and the previously discussed lateral acceleration $a_y$. The two accelerations form a resulting acceleration $a_{res}$ that in turn forms an angle β to the gravitational acceleration g.

Figure 4:
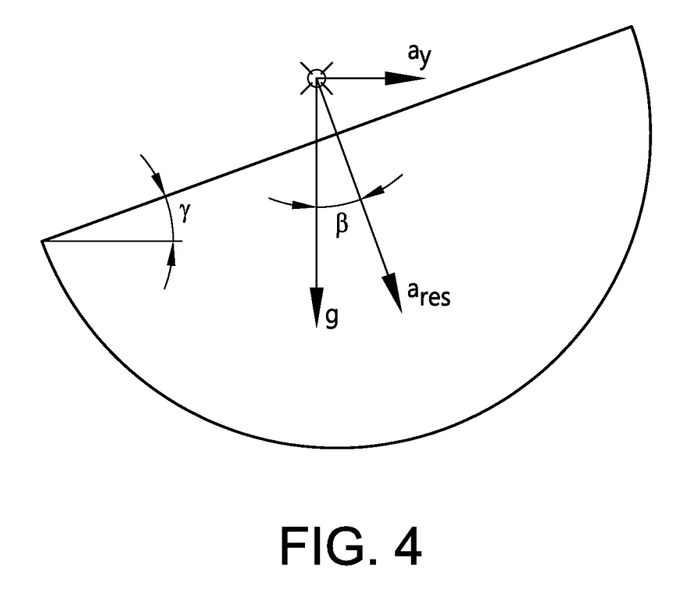
FIG. 4 illustrates a portion of a marine vessel.

Moreover, as indicated in FIG. 4, the marine vessel 10 is inclined with a certain roll angle γ. When the angle β corresponds to the roll angle γ, the inertial forces imparted on an object on the marine vessel 10 by the two accelerations g, $a_y$ will be oriented in a direction corresponding to a vertical direction, had the marine vessel 10 been floating at even keel.

As such, even though the marine vessel 10 has an inclination with a certain roll angle γ and even though the marine vessel 10 has a certain lateral acceleration $a_y$, the dynamic condition illustrated in FIG. 4 is generally not perceived as an uncomfortable condition for passengers of the marine vessel 10.

Thus, a desired lateral acceleration $a_{yd}$ may be determined such that an absolute value of the difference between the desired lateral acceleration $a_{yd}$ and the gravitational acceleration g multiplied by the tangent of the expected roll angle γ is below a threshold value $a_{tol}$. As such, a desired lateral acceleration $a_{yd}$ may be determined that fulfils the below inequality:

$$|a_{yd} - g \cdot \tan(\gamma)| \leq a_{tol} \qquad (Eq. 4)$$

The expected roll angle γ may be determined in a plurality of different ways. Purely by way of example, the expected roll angle γ may be determined using a look-up table comprising the roll angle γ for the marine vessel 10 when the vessel turns for a plurality of radii of curvature and for a plurality of speeds for the relevant marine vessel 10. Purely by way of example, such a look-up table may be determined using a test procedure and/or simulations for the relevant marine vessel 10.

As a non-limiting example, the threshold value $a_{tol}$ may be within the range of 0 to 0.2 g, preferably within the range of 0.05 g to 0.15 g.

Moreover, for at least certain types of marine vessels, as exemplified in for instance WO2015/072895 A1, it is possible to control the roll angle of the vessel by controlling the position of propulsion units thereof. As such, it is envisaged that embodiments of the present invention comprises a step of determining a preferred expected roll angle γ obtainable by controlling the propulsion units and thereafter controlling the speed of the marine vessel such that the marine vessel has a resulting lateral acceleration having been selected taking the preferred expected roll angle γ into account, e.g. by striving for a "true turn" condition using Eq. 4 hereinabove.

Instead of, or in addition to, determining a speed profile from a comfort point of view, e.g. such that passengers of the marine vessel 10 experience a pleasant voyage, the speed profile $v_p$ may also be determined as a speed profile that the marine vessel 10 can assume whilst being able to follow the travel segment 36. In other words, the speed profile $v_p$ may be determined in order to ensure an appropriate path following capacity of the marine vessel 10.

Purely by way of example, an appropriate path following of the marine vessel 10 may be obtained using a speed profile $v_p$ for which the lateral acceleration of the marine vessel 10 is equal to or lower than a desired lateral acceleration $a_{yd}$. In other words, as a non-limiting example, an appropriate path following capability may be arrived at by selecting a desired lateral acceleration $a_{yd}$ for which the marine vessel 10 can stay on the path defined by the travel segment 36 and the speed profile $v_p$ may thereafter be determined using e.g. Eq. 2 hereinabove.

As another non-limiting example, an appropriate path following of the marine vessel 10 may be ensured by determining a lateral thrust $F_{ty}$ produced by the propulsion assembly 12 of the marine vessel 10. On the basis of at least the curvature value and the lateral thrust $F_{ty}$, the speed profile $v_p$ for the marine vessel 10 along the travel segment 36 may be determined. Purely by way of example, a speed v of the marine vessel 10 may be determined in accordance with the following:

$$v = \frac{R\sqrt{F_{ty}}}{C} \quad \text{(Eq. 5)}$$

wherein:
v=the speed of the marine vessel 10;
$F_{ty}$=lateral thrust;
C=marine vessel specific constant, and
R=the radius of curvature.

The marine vessel 10 specific constant C may for instance be determined using sea trials, for instance by solving Eq. 5 for a turn with a known radius of curvature R, a known speed v and a known lateral thrust $F_{ty}$. The lateral thrust $F_{ty}$ may for instance be determined using e.g. information indicative of the steering angle and throttle position of each one of the propulsion units of the propulsion assembly 12.

Moreover, it should also be noted that although the embodiments of the method exemplified hereinabove calculate a speed v in order to determine a speed profile, it is also envisaged that embodiments of the method may determine a speed profile using a look-up table comprising speed profiles for different curvature values.

Purely by way of example, such a look-up table may be generated on the basis of sea trials wherein the marine vessel 10, or a vessel comparable to the marine vessel 10, is operated at different speed profiles in segments with different curvatures and combinations of speed profiles and curvatures that result in appropriate driving conditions, e.g. from a comfort and/or a path following point of view, are thereafter stored for subsequent use in the look-up table. Again, though purely by way of example, the speed profiles may be a constant speed.

As a non-limiting example, the look-up table may comprise combination of speed profiles and curvatures resulting in turning conditions appropriately close to the previously discussed "true turn" condition. Purely by way of example, a combination of speed profile and curvature may be determined to result in a turn appropriately close to a "true turn" if the absolute value of the difference between the angles β and γ, see FIG. 4, is less than 10°, preferably less than 5°.

Irrespective of which parameters are used for determining the speed profile, the method for determining the speed profile may also comprise a step of determining information indicative of the possible deceleration of the marine vessel 10. As such, if the speed profile is indicative of a speed lower than the speed that the marine vessel has prior to entering the travel segment 36, the information indicative of the possible deceleration of the marine vessel 10 may be used for determining when, and possibly also how, the marine vessel 10 should be slowed down before reaching and passing the travel segment 36.

Although the method presented hereinabove may be suitable for controlling a marine vessel 10 when travelling at sea, the method may instead, or in addition, be used for determining a travel path time along a travel path for a marine vessel. As such, it is envisaged that the above method may be used in a method for determining a travel path time along a travel path for a marine vessel. The method comprises:

determining a travel segment set for the travel path, the travel segment set comprising at least one travel segment;

for each travel segment in the travel segment set, determining a speed profile, for instance in accordance with any one of the examples discussed hereinabove, and, using at least the speed profile, determining a segment travel time along the segment, and summarizing the segment travel time for each travel segment in the travel segment set to thereby obtain the travel path time.

Preferably, the travel segments of the travel segment set together form the full travel path. Thus, though purely by way of example, the travel segment set may be obtained by splitting the travel path into travels segments thus forming the travel segment set.

The travel path time may be used as such for determining a time of arrival for instance. However, the travel path time may also be useful in a method for determining a target travel path from a start position to an end position for a marine vessel. Such a method may comprise the following features:

determining a travel path set comprising a plurality of travel paths, each travel path following an individual path from the start position to the end position;

for each travel path in the travel path set, determining a travel path time as has been discussed hereinabove, and setting the target travel path as the travel path having the shortest travel path time.

Purely by way of example, the travel path set may comprise at least two, preferably at least three, more preferred at least five, travel paths wherein each one of the travel paths in the travel path set follows an individual path from the start position to the end position.

The above target travel path determination method can take the speed profile for various travel segments into account. For instance, the above target travel path determination method can take speed reductions needed in order to avoid undesired lateral accelerations into account. As such, the above method may evaluate whether it is more time efficient to follow a first travel path, being relatively short but comprising relatively sharp turns, as compared to following a second travel path, being longer than the first travel path but comprising smoother turns.

It is to be understood that the present invention is not limited to the embodiments described above and illustrated in the drawings; rather, the skilled person will recognize that many changes and modifications may be made within the scope of the appended claims.

The invention claimed is:

1. A method for determining a speed profile for a marine vessel, said method comprising:
   determining, by a processor, a travel segment along which said marine vessel is expected to travel;
   determining, by a processor, a curvature value indicative of a curvature of said travel segment;
   on the basis of at least said curvature value, determining a speed profile for said marine vessel along said travel segment;
   determining an expected roll angle of said marine vessel along said travel segment;
   determining a desired lateral acceleration of said marine vessel along said travel segment on the basis of at least said expected roll angle; and
   on the basis of at least said curvature value and said desired lateral acceleration, determining said speed profile for said marine vessel along said travel segment,
   wherein said desired lateral acceleration (ayd) is determined such that an absolute value of the difference between said desired lateral acceleration (ayd) and the gravitational acceleration multiplied by the tangent of said expected roll angle is below a threshold value.

2. The method according to claim 1, wherein said desired lateral acceleration is a predetermined lateral acceleration.

3. The method according to claim 1, wherein said speed profile is determined as a speed profile that the marine vessel can assume whilst being able to follow the travel segment.

4. The method according to claim 3, wherein said method further comprises determining a lateral thrust produced by a propulsion assembly of said marine vessel and
   on the basis of at least said curvature value and said lateral thrust, determining said speed profile for said marine vessel along said travel segment.

5. The method according to claim 1, wherein said speed profile is determined using a look-up table comprising speed profiles for different curvature values.

6. The method according to claim 1, wherein said curvature value is indicative of a radius of curvature of said travel segment.

7. The method according to claim 6, wherein said radius of curvature is determined using the location of at least three points located on said travel segment.

8. The method according to claim 1, wherein said method further comprises setting a maximum allowable speed for said marine vessel.

9. The method according to claim 1, wherein said speed profile is a constant speed along said travel segment.

10. A control unit for a marine vessel, said control unit being adapted to perform all the method steps according to claim 1.

11. The control unit according to claim 10, wherein said control unit is adapted to issue speed control information, indicative of said speed profile, to a speed controller of said marine vessel.

12. A control assembly for a marine vessel, said control assembly comprising a control unit according to claim 10, said control assembly further comprising a speed controller adapted to communicate with said control unit.

13. A propulsion assembly for a marine vessel, said propulsion assembly comprising at least one propulsion unit and a control assembly according to claim 12, said speed controller of said control assembly being adapted to communicate with said at least one propulsion unit.

14. A marine vessel comprising a control unit according to claim 10.

* * * * *